United States Patent [19]
Oda

[11] Patent Number: 6,015,118
[45] Date of Patent: Jan. 18, 2000

[54] CONTROL CABLE GUIDE FOR A BICYCLE

[75] Inventor: Hiromi Oda, Wakayama, Japan

[73] Assignee: Shimano, Inc., Osaka, Japan

[21] Appl. No.: 08/881,895

[22] Filed: Jun. 23, 1997

[51] Int. Cl.[7] ........................................ B62H 1/00
[52] U.S. Cl. .................. 248/65; 74/502.2; 280/288.4
[58] Field of Search ................ 248/65, 74.1, 52; 280/264, 288.4; 74/502.2

[56] References Cited

U.S. PATENT DOCUMENTS

| | | | |
|---|---|---|---|
| 3,426,614 | 2/1969 | Brilando et al. | 280/288.4 X |
| 4,102,219 | 7/1978 | Plamper | 74/502 |
| 4,616,523 | 10/1986 | Jones | 280/264 X |
| 4,753,448 | 6/1988 | Nagashima | 280/264 |
| 4,930,798 | 6/1990 | Yamazaki et al. | |
| 5,568,905 | 10/1996 | Smith, II. | |
| 5,615,585 | 4/1997 | Chi. | |
| 5,624,334 | 4/1997 | Lumpkin. | |
| 5,673,878 | 10/1997 | Yamate et al. | 248/65 |

FOREIGN PATENT DOCUMENTS

| | | |
|---|---|---|
| 33-10223 | 7/1958 | Japan. |
| 35-28832 | 10/1960 | Japan. |
| 37-20221 | 8/1962 | Japan. |
| 40-31789 | 11/1965 | Japan. |
| 44-13304 | 6/1969 | Japan. |
| 45-29052 | 11/1970 | Japan. |
| 48-2607 | 1/1973 | Japan. |
| 48-25546 | 7/1973 | Japan. |
| 49-36188 | 10/1974 | Japan. |
| 50-29820 | 9/1975 | Japan. |
| 50-41641 | 11/1975 | Japan. |
| 52-162644 | 12/1977 | Japan. |
| 53-26295 | 7/1978 | Japan. |
| 55-40474 | 10/1980 | Japan. |
| 55-54083 | 12/1980 | Japan. |
| 56-10630 | 3/1981 | Japan. |
| 56-55106 | 12/1981 | Japan. |
| 58-3741 | 1/1983 | Japan. |
| 58-25882 | 2/1983 | Japan. |
| 58-39273 | 9/1983 | Japan. |
| 59-1012 | 1/1984 | Japan. |
| 61-26692 | 2/1986 | Japan. |
| 64-20019 | 1/1989 | Japan. |
| 2-395 | 1/1990 | Japan. |
| 4-78318 | 7/1992 | Japan. |
| 4-135893 | 12/1992 | Japan. |
| 8-156863 | 6/1996 | Japan. |
| 2530306 | 12/1996 | Japan. |
| 9-58553 | 3/1997 | Japan. |
| 9-58554 | 3/1997 | Japan. |
| 223841 | 5/1994 | Taiwan. |

OTHER PUBLICATIONS 1 page of drawings from FR 1,031,808; published prior to the filing date of this application.

*Primary Examiner*—Derek J. Berger
*Attorney, Agent, or Firm*—James A. Deland

[57] ABSTRACT

A cable guide for a bicycle includes an annular monomerous mounting member having a substantially flat upper surface and a substantially flat lower surface. The mounting member includes a circular mounting opening, wherein the mounting opening has a diametrical axis that is parallel to a mounting plane. A cable support member is coupled to the mounting member between the upper surface and the lower surface, wherein the cable support member has a cable passage including a cable entry opening and a cable exit opening. The cable passage has a straight longitudinal axis passing through the cable entry opening and the cable exit opening such that the longitudinal axis is inclined less than approximately 45° relative to the mounting plane. A diameter of the mounting opening along its entire length in a direction perpendicular to the mounting plane is greater than a diameter of the cable passage along its entire length in a direction of the longitudinal axis.

38 Claims, 8 Drawing Sheets

CONTROL CABLE GUIDE FOR A BICYCLE

BACKGROUND OF THE INVENTION

The present invention is directed to bicycle control cable systems and, more particularly, to an apparatus for guiding a control cable from a controlling device such as a brake lever or shift lever to a controlled device such as a brake or transmission.

Figure 1:
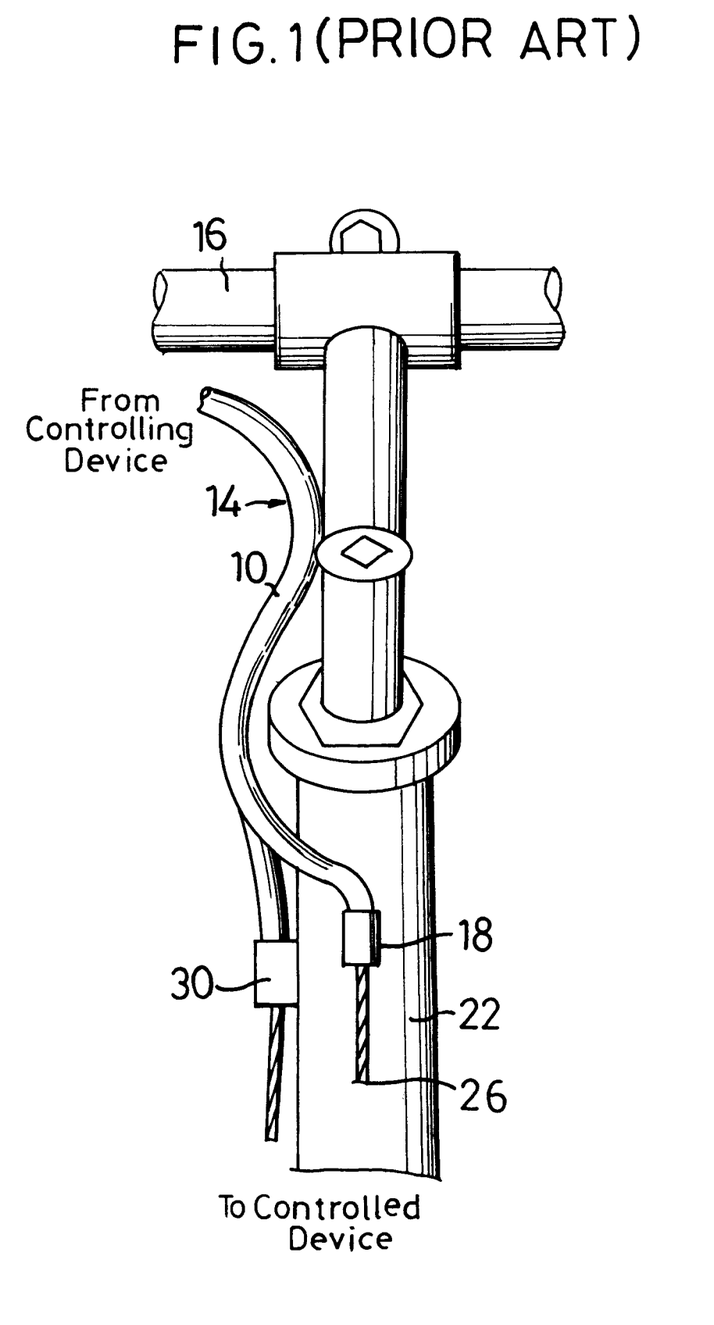
FIG. 1 is a top view of a portion of a prior art bicycle frame showing cable routing along the frame.

Bicycle control devices typically use control cables of the type having an inner wire that slides within an outer casing. One end of the inner wire is connected to a controlling device such as a brake lever, shift lever, twist-grip control device, etc. mounted on the bicycle handlebar, and the other end of the inner wire is connected to a controlled device such as a brake or transmission located at some distance from the controlling device. Because the controlled device is located at some distance from the controlling device, the control cable typically must be routed along the bicycle frame and fastened to the frame so that the control cable does not interfere with the rider or with other bicycle components. FIG. 1 shows a typical cable routing scheme wherein an outer casing 10 of a control cable 14 originating at a controlling device (not shown) mounted to a handlebar 16 is stopped at a cap receiver 18 brazed to the bicycle frame 22. The inner wire 26 exits the outer casing 10 at cap receiver 18 and proceeds to the rear of the bicycle. If the control cable 14 is used to control a derailleur, for example, then the inner wire 26 will enter another portion of the outer casing (not shown) stopped at another cap receiver (not shown) located at the rear of the bicycle. The control cable 14 then will be routed to the derailleur.

As shown in FIG. 1, the control cable 14 typically bends as it proceeds to the cap receiver 18 in order to accommodate obstructions such as the head tube and bearing assemblies. Unfortunately, bends in the control cable decrease the force transmission efficiency of the control cable because of friction between the inner wire and the outer casing. For example, one bend in the control cable can decrease the force transmission efficiency by 10%, two bends in the control cable can decrease the force transmission efficiency by 20%, and three bends in the control cable (the situation shown in FIG. 1) can decrease the force transmission efficiency by 30%. If the control cable bends again at the rear of the bicycle, for example, at the seat tube, then the total of four bends can decrease the force transmission efficiency by 35%. Such decreases in the force transmission efficiency are of great concern to the manufacturer of the controlling and controlled devices, since poor performance of the controlling and controlled devices often is blamed unjustly on the quality of the manufacturer's products and not on the bends in the cable system. Unfortunately, the location of the cap receivers on the bicycle as well as the geometry of the frame are determined by the frame manufacturer, so the manufacturer of the controlling and controlled devices has no control over the number of bends in the control cable when the control cable is attached to the bicycle frame. Even if the frame maker places the cap receivers on the side of the bicycle frame, such as cap receiver 30 shown in FIG. 1, the control cable still must bend around the head tube before the control cable can be attached to the cap receiver, thus again resulting in three bends in the control cable. Furthermore, such cap receiver placement does not overcome the problem of bends in other frames having a different geometry.

SUMMARY OF THE INVENTION

The present invention is directed to a control cable guide for a bicycle which helps to eliminate bends in the control cable without relying on the location of the cap receivers set by the frame builder or the geometry of the frame. Generally, the invention includes the use of a detachable cable guide in the vicinity of the head tube and a cable guide roller in the vicinity of the seat tube in order to minimize and control bends in the control cable system. In one embodiment of the present invention, a detachable cable guide used in the vicinity of the head tube of the bicycle includes an annular monomerous mounting member having a substantially flat upper surface, a substantially flat lower surface, and a circular mounting opening, wherein the mounting opening has a diametrical axis that is parallel to a mounting plane. A cable support member is coupled to the mounting member between the upper surface and the lower surface, wherein the cable support member has a cable passage including a cable entry opening and a cable exit opening. The cable passage has a straight longitudinal axis passing through the cable entry opening and the cable exit opening such that the longitudinal axis is inclined less than approximately 45° relative to the mounting plane. A diameter of the mounting opening along its entire length in a direction perpendicular to the mounting plane is greater than a diameter of the cable passage along its entire length in a direction of the longitudinal axis. Thus, the resulting structure may be mounted to the head tube so that the handlebar stem passes through the mounting member, and the cable passages direct the inner wire of the control cable to the rear of the bicycle. A roller may be positioned at the seat tube or on the seat stem for further guiding the inner wire to a controlled device.

In another embodiment of the present invention, a mounting member of a cable guide used in the vicinity of the head tube of a bicycle includes a first mounting section and a second mounting section. The first mounting section includes a first mounting section opening with a first mounting section opening diameter and a first mounting section outer peripheral surface with a first mounting section outer peripheral surface diameter. Similarly, the second mounting section includes a second mounting section opening with a second mounting section opening diameter and a second mounting section outer peripheral surface with a second mounting section outer peripheral surface diameter. In this embodiment, the first mounting section opening diameter is greater than the second mounting section opening diameter, and the first mounting section outer peripheral surface diameter is greater than the second mounting section outer peripheral surface diameter. A cable support member having a cable passage is coupled to the mounting member, wherein the cable support has a cable support outer peripheral surface facing and spaced apart from the second mounting section outer peripheral surface. With this structure, the mounting member may function as an upper head bearing cup with the second mounting section inserted into the head tube. The space between the outer peripheral surface of the cable support member and the outer peripheral surface of the second mounting section accommodates the head tube between the components so that the cable passage may be located on the side of the head tube. Also, the location and spacing between the cable support member and the outer peripheral surface of the second mounting section may be varied to optimize the control cable route and minimize bends.

In another embodiment of the present invention, a cable guide that may be attached to any structural member of a bicycle includes a first arm having a first end and a second end and a second arm having a first end and a second end, wherein the first end of the first arm is structured for connecting to the second end of the second arm so that the first arm and the second arm lie within a mounting plane. A cable support member having a cable passage including a cable entry opening and a cable exit opening is mounted to one of the first arm or the second arm. The cable passage has a straight longitudinal axis passing through the cable entry opening and the cable exit opening such that the longitudinal axis is inclined relative to an axis perpendicular to the mounting plane. The first end of the first arm may be pivotally connected to the first end of the second arm, and a fastener may be used to connect the second end of the first arm to the second end of the second arm. As a result, the cable guide may be easily attached to and removed from any structural member of a bicycle by removing the fastener and pivoting the first arm relative to the second arm.

DETAILED DESCRIPTION OF THE EMBODIMENTS

Figure 2:
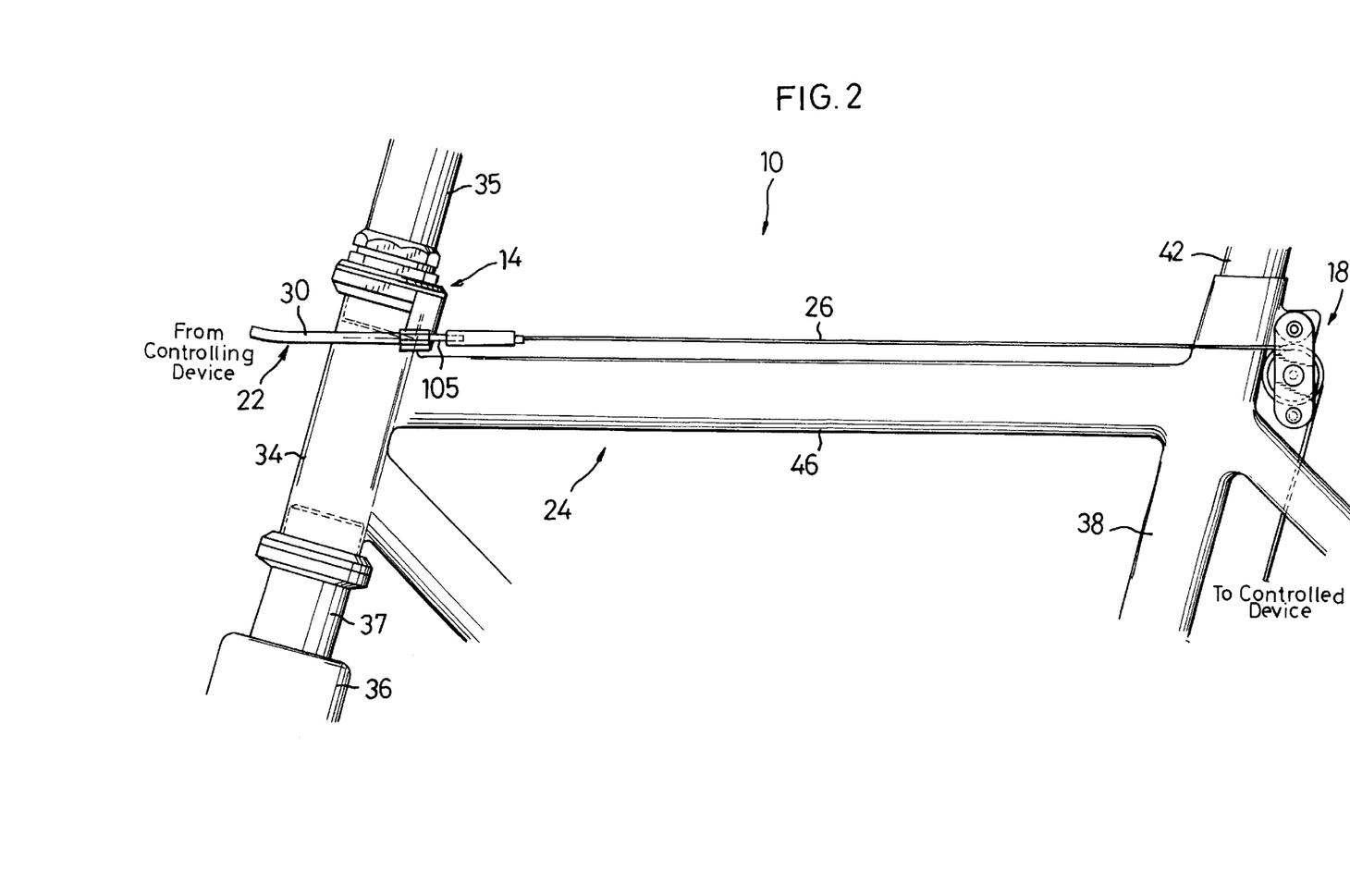
FIG. 2 is a side view of a particular embodiment of a control cable guide system according to the present invention.
Figure 3:
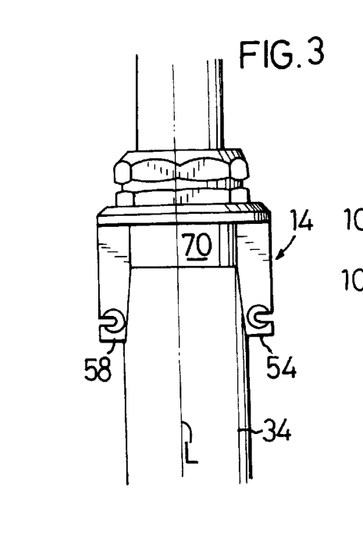
FIG. 3 is a rear view of a particular embodiment of a head tube cable guide according to the present invention installed within a head tube.
Figure 4:
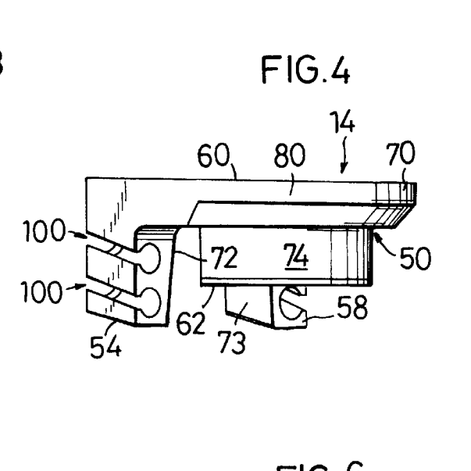
FIG. 4 is a perspective view of the head tube cable guide shown in FIG. 3 removed from the head tube.
Figure 5:
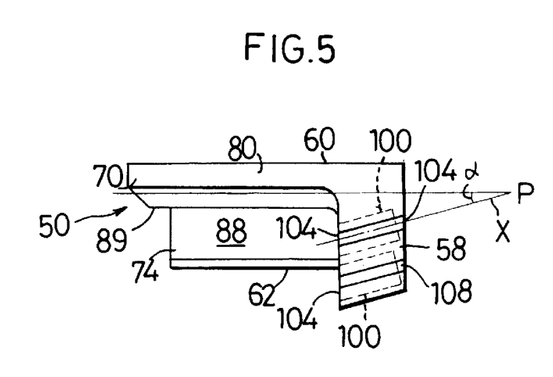
FIG. 5 is a side view of the head tube cable guide shown in FIG. 4.
Figure 6:
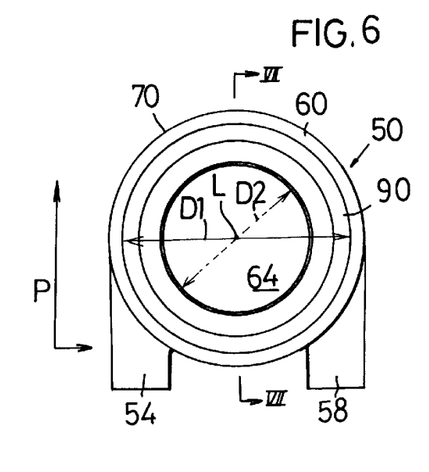
FIG. 6 is a top view of the head tube cable guide shown in FIG. 4.
Figure 7:
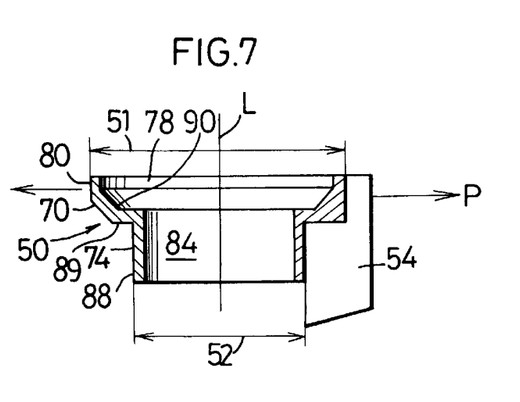
FIG. 7 is a view taken along line VII—VII in FIG. 6.

FIG. 2 is a side view of a particular embodiment of a control cable guide system 10 according to the present invention. Control cable guide system 10 includes a head tube cable guide 14 and a seat tube cable guide 18 for guiding a control cable 22 from a controlling device (not shown) to a controlled device (not shown) along a bicycle frame 24. Control cable 22 is a well known type wherein an inner wire 26 slides within an outer casing 30. Bicycle frame 24 is a conventional type having a head tube 34 for supporting a handlebar (not shown) through a handlebar stem 35 and for supporting a fork 36 through a fork stem 37, a seat tube 38 for supporting a seat (not shown) through a seat post 42, a top tube 46 connected between head tube 34 and seat tube 38, and other frame members. Of course, a cable guide system according to the present invention can be used with any other type of frame.

As shown in FIGS. 3–7, head tube cable guide 14 includes a mounting member 50 and cable supports 54 and 58. In this embodiment, mounting member 50 is an annular monomerous (one-piece) unit having a substantially flat upper surface 60, a substantially flat lower surface 62, and a circular mounting opening 64 of varying diameters. Opening 64 has diametrical axes D1 and D2 that are parallel to a mounting plane P that is defined as being some plane perpendicular to a longitudinal axis L of head tube 34. For the present purposes, a diametrical axis may be located anywhere within opening 64 as long as it represents a diameter of the opening in the ordinary sense and is parallel to mounting plane P.

In this embodiment, mounting member 50 includes a mounting section 70 and a mounting section 74. Mounting section 70 includes (I) a circular first mounting section opening 78 with a first mounting section opening diameter D1; and (ii) a first mounting section outer peripheral surface 80 with a first mounting section outer peripheral surface diameter 51. Similarly, second mounting section 74 includes (I) a circular second mounting section opening 84 with a second mounting section opening diameter D2; and (ii) a circular second mounting section outer peripheral surface 88 with a second mounting section outer peripheral surface diameter 52. From inspection it should be apparent that the first mounting section opening diameter D1 is greater than the second mounting section opening diameter D2, and the first mounting section outer peripheral surface diameter 51 is greater than the second mounting section outer peripheral surface diameter 52 for forming an external abutment 89 between first mounting section 70 and second mounting section 74. In other words, first mounting section outer peripheral surface 80 is disposed radially outwardly from second section outer peripheral surface 88. The second mounting section outer peripheral surface diameter 52 is set so that second mounting section 74 fits within head tube 34, and first mounting section 70 extends above and radially outwardly from the upper end of head tube 34 with abutment 89 contacting the upper end of head tube 34. In this embodiment first mounting section 70 includes an inclined surface 90 forming a circular bearing race so that mounting member 50 may serve as a cup for an upper head bearing of well known function.

Cable support members 54 and 58 are coupled to mounting member 50 between upper surface 60 and lower surface 62, and they are spaced apart from each other in the circumferential direction of mounting member 50. In this embodiment, cable support members 54 and 58 are formed as one piece with first mounting section 70, and they extend downwardly from the outer peripheral surface 80 of first mounting section 70 such that outer peripheral surfaces 72 and 73 (FIG. 4) of cable support members 54 and 58 are spaced apart from the outer peripheral surface 88 of second mounting section 74. Such spacing allows mounting member 50 to be fitted within head tube 34 so that head tube 34 is sandwiched between cable support members 54 and 58 and second mounting section 74. The spacing between cable support members 54 and 58 and the outer peripheral surface 88 of second mounting section 74 may be adjusted to optimize the orientation of the control cables and to help the control cables clear the head tube and head bearing without bends.

Each cable support member 54 and 58 includes a pair of cable passages 100, and each cable passage 100 includes a cable entry opening 104 and a cable exit opening 108. Each cable passage 100 also accommodates a straight longitudinal axis X passing through the cable entry opening 104 and the cable exit opening 108, wherein each longitudinal axis X is inclined by an angle α less than approximately 45°, for example, between approximately 15° and approximately 21° (such as 18°) relative to the mounting plane P. The purpose of this inclination is to direct each cable passage 100 toward a corresponding peripheral cable guide surface 244 (FIG. 8) at the seat tube cable guide 18 so that the inner wire 26 of control cable 22 may pass through cable passage 100 in a substantially straight line toward the corresponding outer peripheral guide surface 244 of seat tube cable guide 18. Since, in this embodiment, mounting member 50 is intended to be mounted inside head tube 34 with handlebar stem 35 passing through opening 64, a diameter of mounting opening 64 along its entire length in a direction perpendicular to the mounting plane P is greater than a diameter of the cable passage 100 along its entire length in a direction of the longitudinal axis X.

Figure 14:
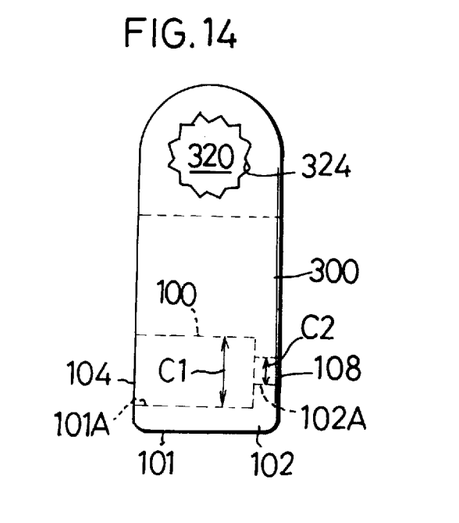
FIG. 14 is a side view of a cable support member used with the head tube cable guide shown in FIG. 12.

As shown more clearly in the embodiment of a cable support member 300 shown in FIG. 14, each cable support member includes a first cable support section 101 defining a circular first cable support section opening 101a having a first cable support diameter C1, and a second cable support section 102 defining a circular second cable support section opening 102a having a second cable support diameter C2. The first cable support diameter C1 is greater than the second cable support diameter C2 so that outer casing 30 of control cable 22, or a nose cap 105 (FIG. 2), may be stopped within the cable passage 100.

Figure 8:
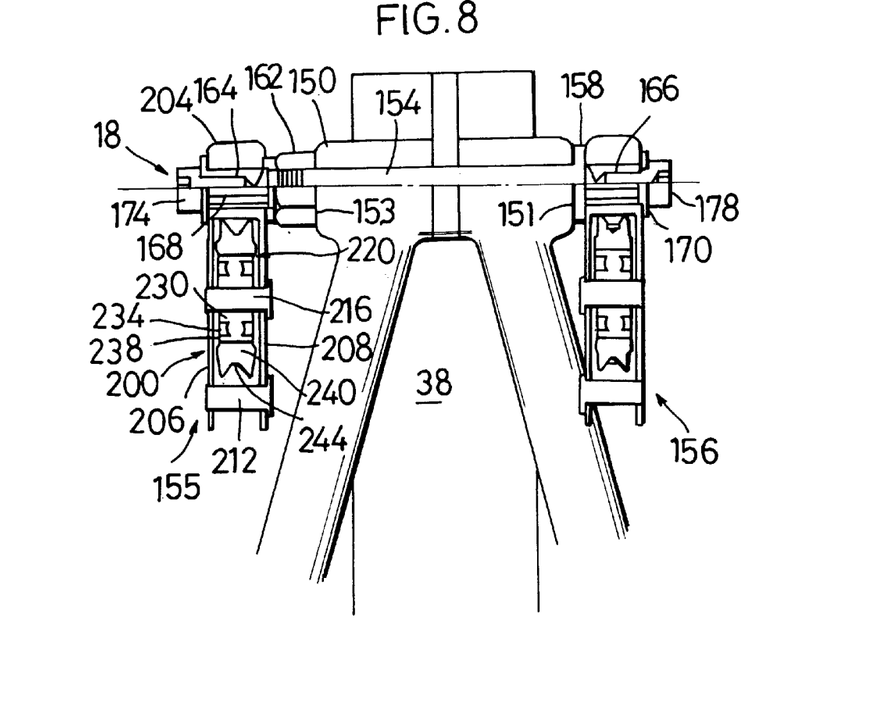
FIG. 8 is a rear partial cross sectional view of a particular embodiment of a seat tube area cable guide according to the present invention.

FIG. 8 is a rear partial cross sectional view of a particular embodiment of seat tube cable guide 18. In this embodiment, seat tube cable guide 18 is mounted to seat tube 38 at a clamping collar 150 ordinarily used for securing seat post 42 to seat tube 38. Seat tube cable guide 18 includes a mounting axle 154 and roller assemblies 155 and 156. Mounting axle 154 includes a flange 158 on one side for abutting against a side surface 151 of clamping collar 150 and a threaded nut 162 on the other side of clamping collar 150 for pressing against another side 153 of clamping collar 150 to cause clamping collar 150 to clamp seat post 42. Opposite ends 164 and 166 of mounting axle 154 include peripheral splines 168 and 170 for reasons discussed below. Roller assembly retaining bolts 174 and 178 threadingly engage the respective ends 164 and 166 of mounting axle 154 for laterally retaining roller assemblies 155 and 156 to mounting axle 154.

Roller assemblies 155 and 156 are constructed identically, so only roller assembly 155 will be described in detail. Roller assembly 155 includes a frame 200 having a base member 204 and side members 206 and 208. A support pin 212 couples the free ends of side members 206 and 208 to each other for stability, and a pivot shaft 216 extends through intermediate portions of side members 206 and 208 for rotatably supporting a roller unit 220. Roller unit 220 includes a cartridge-type bearing having an inner ring 230 supported on pivot shaft 216, an outer ring 238 supporting a roller ring 240 having an outer peripheral cable guide surface 244, and a plurality of ball bearings 234 disposed between inner ring 230 and outer ring 238 for rotatably supporting outer ring 238 and roller ring 240 on inner ring 230.

Figure 9:
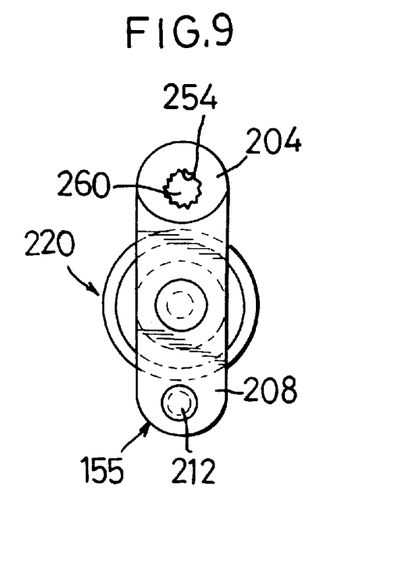
FIG. 9 is a side view of one of the roller assemblies shown in FIG. 8.
Figure 10:
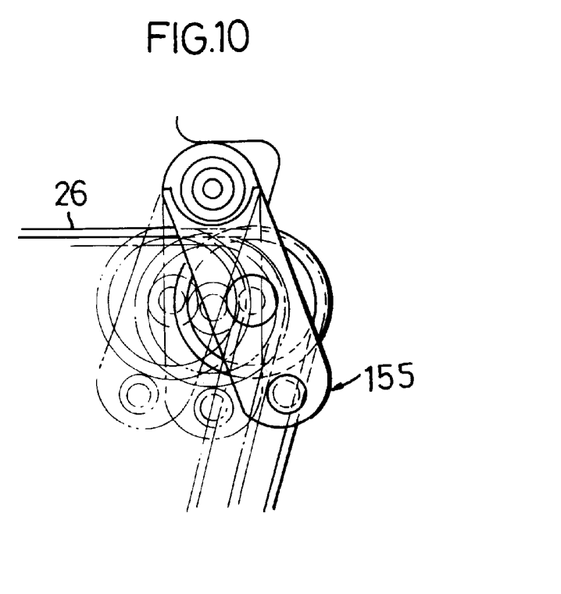
FIG. 10 is a view of one of the roller assemblies shown in FIG. 8 illustrating optional positioning of the roller assembly.

As shown more clearly in FIG. 9, base member 204 includes a mounting opening 260 having a plurality of splines 254 formed on an inner peripheral surface thereof for engaging the splines 168 on end 164 of mounting axle 154. Thus, frame 200 of roller assembly 155 is incapable of rotation relative to mounting axle 154 when roller assembly 155 is retained to mounting axle 154 with retaining bolt 174. However, the angular position of frame 200 may be adjusted by loosening retaining bolt 174, rotating frame 200 so that splines 254 of base 204 engage splines 168 of end 164 at a different mounting angle, and retightening retaining bolt 174. As a result, roller assembly 155 may be set to a plurality of angular positions as shown in FIG. 10 so that inner wire 26 of control cable 22 may pass around the outer peripheral guide surface 244 of roller ring 240 and be directed in the appropriate manner to the controlled device.

Figure 11:
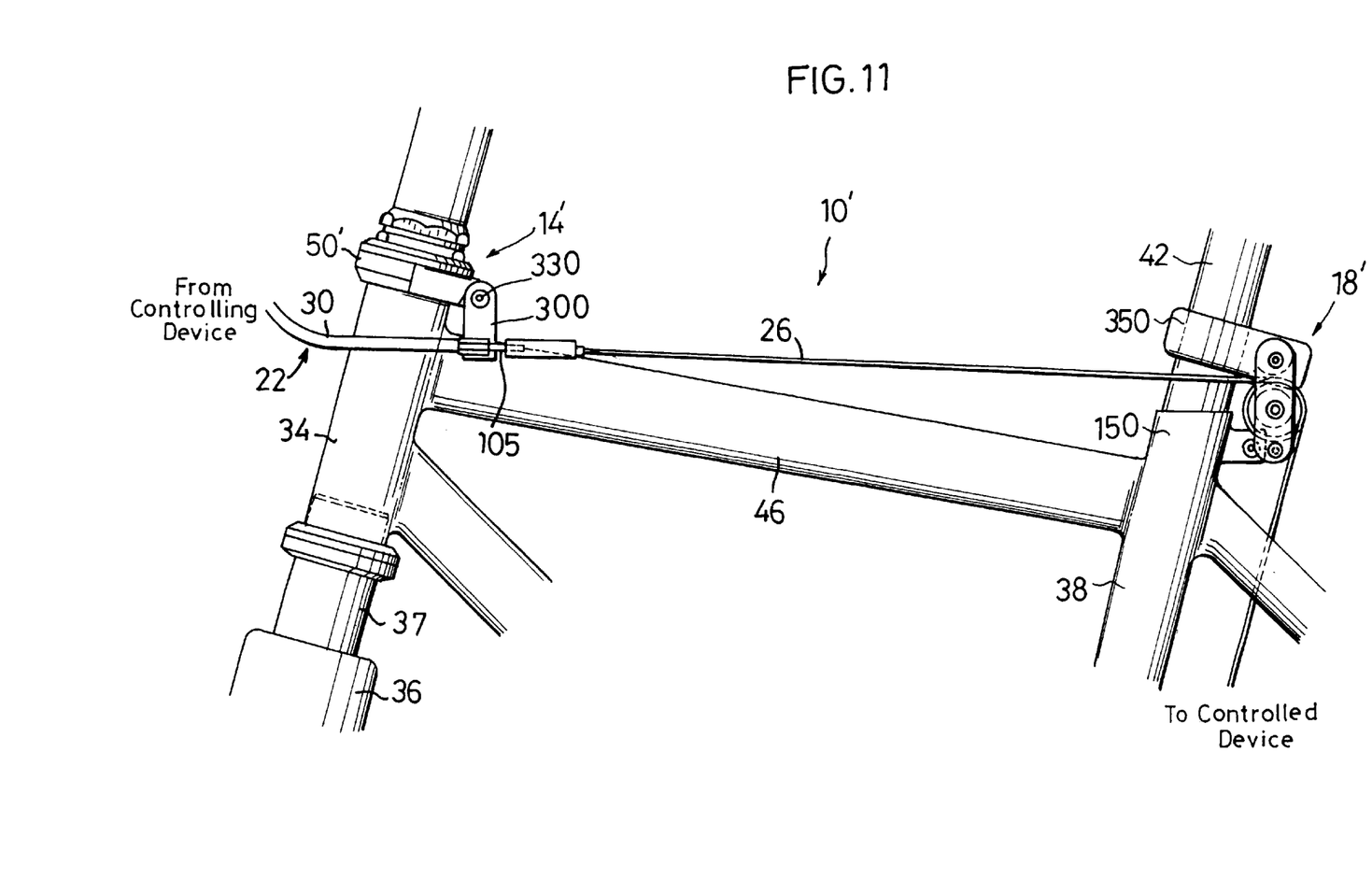
FIG. 11 is a side view of another embodiment of a control cable guide system according to the present invention.

FIG. 11 is a side view of another embodiment of a control cable guide system 10' according to the present invention. This embodiment is very similar to the embodiment shown in FIG. 2, and the parts that are identical are numbered the same. In this embodiment, however, head tube area cable guide 14' and seat tube area cable guide 18' are constructed slightly differently from the corresponding units shown in FIG. 2. Since the differences are slight, only those differences will be discussed.

Figure 12:
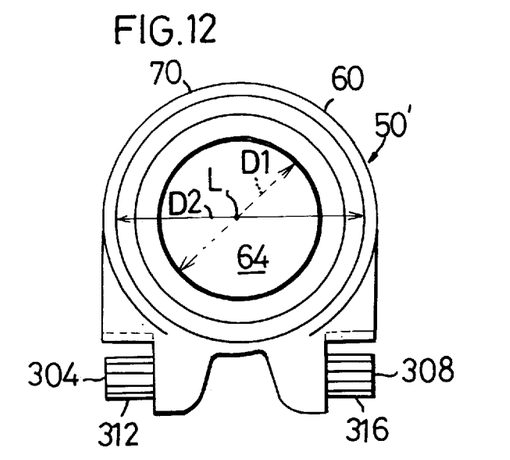
FIG. 12 is a top view of the head tube cable guide shown in FIG. 11.
Figure 13:
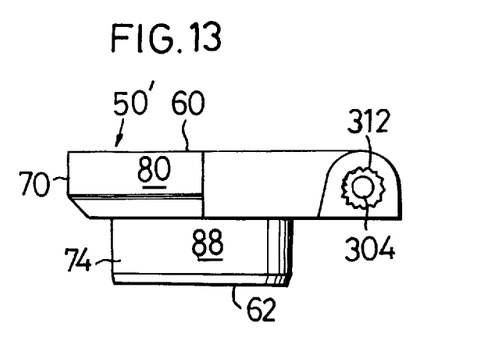
FIG. 13 is a side view of the head tube cable guide shown in FIG. 12.

In this embodiment, the cable support members are formed as cable support arms 300 that are adjustably mounted to mounting member 50' through retaining bolts 330 (FIG. 11). More specifically, as shown in FIGS. 12 and 13, mounting member 50' includes mounting shafts 304 and 308 with splines 312 and 316 formed on the respective outer peripheral surfaces thereof. As shown in FIG. 14, each cable support arm 300 includes an opening 320 having complementary splines 324 formed on an inner peripheral surface thereof for meshing with the splines on the associated mounting shaft 304 or 308. As with roller assemblies 155 and 156 in FIG. 8, the angular position of each cable support arm 300 may be adjusted by setting the appropriate spline relationship between cable support arm 300 and its associated mounting shaft 304 or 308.

Seat tube cable guide 18' differs from the embodiment shown in FIG. 8 in that the seat tube cable guide 18' is not mounted to the clamping collar 150 on seat tube 38. Instead, seat tube cable guide 18' is mounted directly to seat post 42 through a clamping collar 350 that has the same structure as clamping collar 150. The remaining structure is the same. Thus, the vertical position of seat tube cable guide 18' may be adjusted by setting clamping collar 350 at the desired vertical position on seat post 42. This structure makes the cable guide system 10' even more independent of frame design because the user need not worry about the structure and orientation of the seat tube.

Figure 15:
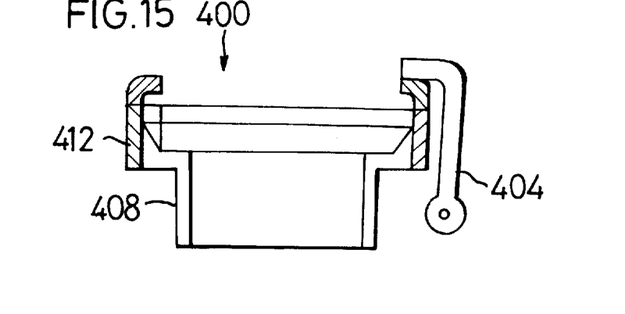
FIG. 15 is a partial cross sectional view of an alternative embodiment of a head tube cable guide according to the present invention.

FIG. 15 is a side view of an alternative embodiment of a head tube cable guide 400 according to the present invention. In this embodiment, one or more cable support members 404 are coupled to a mounting member 408 through a retainer in the form of a metal or resin annular ring 412 that snugly fits around mounting member 408.

Figure 16:
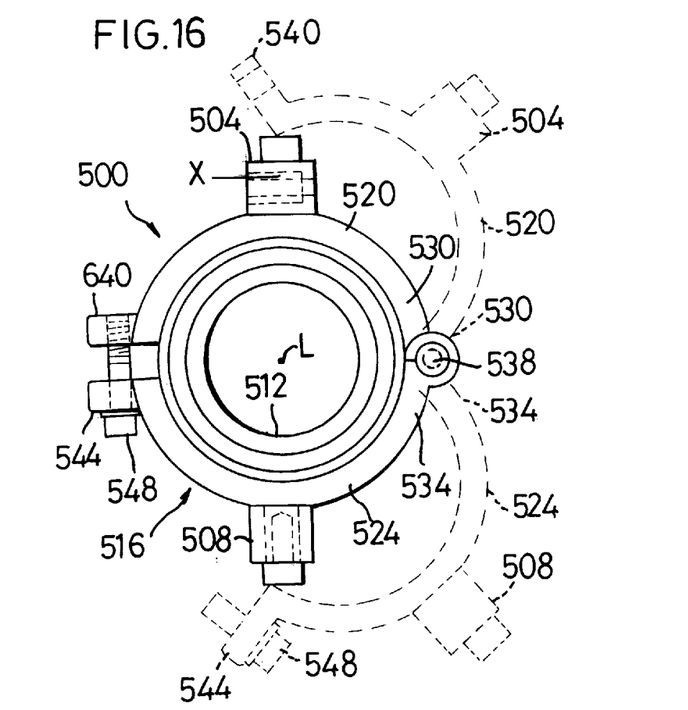
FIG. 16 is a top view alternative embodiment of a head tube cable guide according to the present invention.
Figure 17:
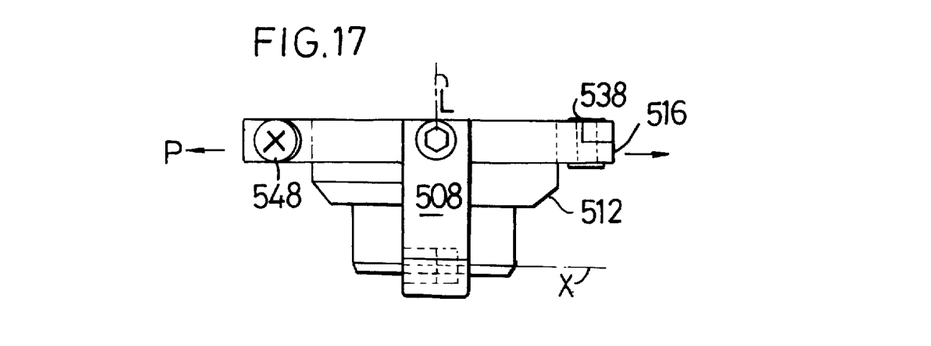
FIG. 17 is a side view of the head tube cable guide shown in FIG. 16.

FIG. 16 is a top view of an alternative embodiment of a head tube cable guide 500 according to the present invention, and FIG. 17 is a side view of the head tube cable guide 500. In this embodiment, cable support members 504 and 508 are coupled to a mounting member 512 through an annular retainer 516. Retainer 516 comprises a first curved (e.g., semicircular) arm 520 and a second curved (e.g., semicircular) arm 524, both of which lie within mounting plane P. A first end 530 of first arm 520 is pivotally connected to a first end 534 of second arm 524 through a pivot shaft 538, and a second bent end 540 of first arm 520 is fastened to a second bent end 544 of second arm 524 through a fastener 548 in the form of a screw that threads into the second bent end 540 of first arm 520. Cable support members 504 and 508 are structured for adjustably coupling to first arm 520 and second arm 524, respectively, in the same manner as the embodiment shown in FIGS. 11–14, but they may be formed integrally with first arm 520 and second arm 524 if desired. The longitudinal axis X of each cable passage in cable support members 504 and 508 is inclined relative to axis L perpendicular to mounting plane P. In this embodiment, retainer 516 is formed separately from mounting member 512 and may be completely removed from mounting member 512 as a unit, but alternatively first end 530 of first arm 520 and first end 534 of second arm 524 may be pivotally connected to a flanged section of mounting member 512. In any event, the cable guide 500 may be easily attached to and removed from any structural member of a bicycle by removing the fastener 548 and pivoting the first arm 520 relative to the second arm 524 as shown by the broken lines in FIG. 16.

Figure 18:
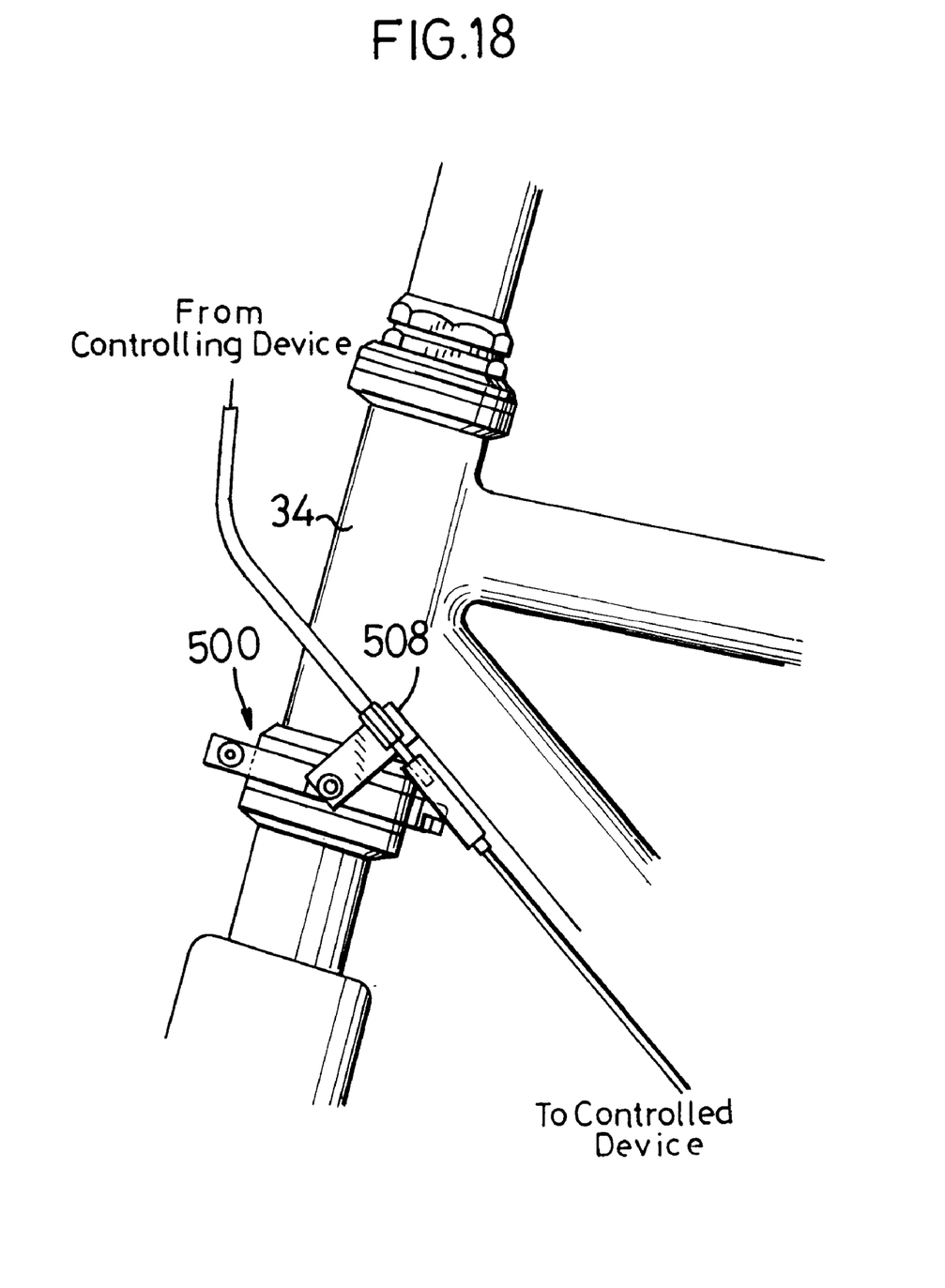
FIG. 18 is a side view showing an alternative mounting arrangement for a head tube cable guide according to the present invention.

While the above is a description of various embodiments of the present invention, further modifications may be employed without departing from the spirit and scope of the present invention. For example, any of the foregoing head tube cable supports may be mounted below the lower end of the head tube as shown in FIG. 18 (using head tube cable support 500 as an example). The size, shape, orientation and number of components used to make the cable guide system may be changed as desired. Head tube cable guides 14 and 14' may be used for conveniently guiding the control cables regardless of whether bends still result in the cables. Thus, the scope of the invention should not be limited by the specific structures disclosed or the advantages obtained. Instead, the true scope of the invention should be determined by the following claims.

What is claimed is:

1. A cable guide for a bicycle comprising:
   an annular monomerous mounting member having a substantially flat upper surface and a substantially flat lower surface, wherein the mounting member includes a circular mounting opening, and wherein the mounting opening has a diametrical axis that is parallel to a mounting plane;
   wherein the mounting member includes:
      a first mounting section defining a first mounting section opening forming a first portion of the mounting opening and having a first mounting section opening diameter;
      wherein the first mounting section includes a first mounting section outer peripheral surface;
      a second mounting section defining a second mounting section opening forming a second portion of the mounting opening and having a second mounting section opening diameter;
      wherein the second mounting section includes a second mounting section outer peripheral surface;
      wherein the first mounting section outer peripheral surface is disposed radially outwardly relative to the second mounting section outer peripheral surface;
   a cable support member coupled to the mounting member between the upper surface and the lower surface and having a cable passage including a cable entry opening and a cable exit opening, wherein the cable passage has a straight longitudinal axis passing through the cable entry opening and the cable exit opening, and wherein the longitudinal axis is inclined less than approximately 45° relative to the mounting plane;
   wherein a diameter of the mounting opening along its entire length in a direction perpendicular to the mounting plane is greater than a diameter of the cable passage along its entire length in a direction of the longitudinal axis;
   wherein the cable support member has an outer peripheral surface facing and spaced apart from the second mounting section outer peripheral surface.

2. The cable guide according to claim 1 wherein the longitudinal axis is inclined approximately 18° relative to the mounting plane.

3. The cable guide according to claim 1 wherein the longitudinal axis is inclined from approximately 15° to approximately 21° relative to the mounting plane.

4. The cable guide according to claim 1 wherein the first mounting section opening diameter is different from the second mounting section opening diameter.

5. The cable guide according to claim 4 wherein the first mounting section opening diameter is greater than the second mounting section opening diameter.

6. The cable guide according to claim 5 wherein the first mounting section includes an inclined surface forming a part of the first mounting section opening.

7. The cable guide according to claim 6 wherein the inclined surface has a circular shape.

8. The cable guide according to claim 5 wherein the first mounting section opening has a circular shape.

9. The cable guide according to claim 8 wherein the second mounting section opening has a circular shape.

10. The cable guide according to claim 1 wherein the mounting member includes an external abutment between the first mounting section and the second mounting section.

11. The cable guide according to claim 1 wherein the cable support member extends from the first mounting section outer peripheral surface.

12. The cable guide according to claim 11 wherein the second mounting section has a circular outer peripheral surface.

13. The cable guide according to claim 1 wherein the cable support member includes:
   a first cable support section defining a first cable support section opening having a first cable support diameter;
   a second cable support section defining a second cable support section opening having a second cable support diameter; and
   wherein the first cable support diameter is different from the second cable support diameter.

14. The cable guide according to claim 13 wherein the first cable support section opening has a circular shape, and wherein the second cable support section opening has a circular shape.

15. The cable guide according to claim 1 further comprising a retainer for retaining the cable support member to the mounting member.

16. The cable guide according to claim 15 wherein the retainer comprises an annular sleeve fitted around the mounting member.

17. The cable guide according to claim 15 wherein the retainer comprises:

a first curved arm;

a second curved arm;

wherein the cable support member is attached to one of the first curved arm and the second curved arm;

wherein the first curved arm is connected to the second curved arm for forming an annular retainer; and wherein the mounting member is fitted within the annular retainer.

18. The cable guide according to claim 15 wherein the retainer comprises:

a first arm having a first end and a second end;

a second arm having a first end and a second end;

wherein the first end of the first arm is pivotally connected to the first end of the second arm;

a fastener for connecting the second end of the first arm to the second end of the second arm; and wherein the cable support member is attached to one of the first arm and the second arm.

19. The cable guide according to claim 1 further comprising a position setting mechanism for setting a plurality of positions of the cable support member relative to the mounting member.

20. The cable guide according to claim 1 wherein the cable support member is formed as one piece with the mounting member.

21. The cable guide according to claim 1 further comprising a tube having an upper end and a lower end, wherein the mounting member is mounted above the upper end of the tube.

22. The cable guide according to claim 1 further comprising a tube having an upper end and a lower end, wherein the mounting member is mounted below the lower end of the tube.

23. A cable guide for a bicycle comprising:

a mounting member including:

a first mounting section having:

a first mounting section opening with a first mounting section opening diameter; and a first mounting section outer peripheral surface with a first mounting section outer peripheral surface diameter;

a second mounting section having:

a second mounting section opening with a second mounting section opening diameter; and a second mounting section outer peripheral surface with a second mounting section outer peripheral surface diameter;

wherein the first mounting section opening diameter is greater than the second mounting section opening diameter;

wherein the first mounting section outer peripheral surface diameter is greater than the second mounting section outer peripheral surface diameter;

a cable support member having a cable passage coupled to the mounting member; and wherein the cable support member has a cable support outer peripheral surface facing and spaced apart from the second mounting section outer peripheral surface.

24. A cable guide for a bicycle comprising:

a tube having an upper end and a lower end;

a separate mounting member mounted to the tube and extending into the tube, wherein the mounting member includes a mounting opening, and wherein the mounting opening has a diametrical axis that is parallel to a mounting plane;

a cable support member coupled to the mounting member so as to be stationary relative to the tube and having a cable passage including a cable entry opening and a cable exit opening, wherein the cable passage has a straight longitudinal axis passing through the cable entry opening and the cable exit opening, and wherein the longitudinal axis is inclined less than approximately 45° relative to the mounting plane; and wherein a diameter of the mounting opening along its entire length in a direction perpendicular to the mounting plane is greater than a diameter of the cable passage along its entire length in a direction of the longitudinal axis.

25. The cable guide according to claim 24 wherein the mounting member has an annular shape.

26. The cable guide according to claim 24 wherein the mounting member is mounted above the upper end of the tube.

27. The cable guide according to claim 24 wherein the mounting member is mounted below the lower end of the tube.

28. A cable guide for a bicycle comprising:

a first arm having a first end and a second end;

a second arm having a first end and a second end;

wherein the first end of the first arm is pivotally connected to the first end of the second arm through a pivot shaft so that the first arm and the second arm pivot within a mounting plane; and a cable support member coupled to at least one of the first arm and the second arm and having a cable passage including a cable entry opening and a cable exit opening, wherein the cable passage has a straight longitudinal axis passing through the cable entry opening and the cable exit opening; and wherein the longitudinal axis is inclined relative to an axis perpendicular to the mounting plane.

29. The cable guide according to claim 28 further comprising a fastener for connecting the second end of the first arm to the second end of the second arm.

30. The cable guide according to claim 28 wherein the first arm has a curved shape, and wherein the second arm has a curved shape.

31. The cable guide according to claim 30 wherein the first arm has a semicircular shape, and wherein the second arm has a semicircular shape.

32. A cable guide for a bicycle comprising:

a mounting member including:

a first mounting section having:

a first mounting section opening with a first mounting section opening diameter; and a first mounting section outer peripheral surface with a first mounting section outer peripheral surface diameter;

a second mounting section having:

a second mounting section opening with a second mounting section opening diameter; and a second mounting section outer peripheral surface with a second mounting section outer peripheral surface diameter;

wherein the first mounting section outer peripheral surface diameter is greater than the second mounting section outer peripheral surface diameter;

wherein the second mounting section has an elongated cylindrical shape; and a cable support member having a cable passage coupled to the first mounting section.

33. The cable guide according to claim 32 wherein the first mounting section opening diameter is greater than the second mounting section opening diameter.

34. A cable guide for a bicycle comprising:
a mounting member including:
a first mounting section having:
a first mounting section opening with a first mounting section opening diameter; and
a first mounting section outer peripheral surface with a first mounting section outer peripheral surface diameter;
a second mounting section having:
a second mounting section opening with a second mounting section opening diameter; and
a second mounting section outer peripheral surface with a second mounting section outer peripheral surface diameter;
wherein the first mounting section outer peripheral surface diameter is greater than the second mounting section outer peripheral surface diameter;
wherein a portion of the second mounting section outer peripheral surface is parallel to a portion of the first mounting section outer peripheral surface; and
a cable support member having a cable passage coupled to the first mounting section.

35. The cable guide according to claim 34 further comprising an outer abutment between the first mounting section outer peripheral surface and the second mounting section outer peripheral surface at a junction between the first mounting section and the second mounting section.

36. The cable guide according to claim 35 wherein the outer abutment is perpendicular to the second mounting section outer peripheral surface.

37. The cable guide surface according to claim 34 wherein the first mounting section opening diameter is greater than the second mounting section opening diameter.

38. A bicycle frame part comprising:
a head tube having an upper end and a lower end;
a separate mounting member mounted to the head tube and extending into the head tube, wherein the mounting member includes a mounting opening, and wherein the mounting opening has a diametrical axis that is parallel to a mounting plane;
a cable support member coupled to the mounting member so as to be stationary relative to the head tube during operation of the bicycle and having a cable passage including a cable entry opening and a cable exit opening, wherein the cable passage has a straight longitudinal axis passing through the cable entry opening and the cable exit opening, and wherein the longitudinal axis is inclined less than approximately 45° relative to the mounting plane; and
wherein a diameter of the mounting opening along its entire length in a direction perpendicular to the mounting plane is greater than a diameter of the cable passage along its entire length in a direction of the longitudinal axis.

* * * * *